United States Patent

Brandl et al.

Patent Number: 5,228,552
Date of Patent: Jul. 20, 1993

[54] LOADING DEVICE FOR MINING

[75] Inventors: Erich Brandl, Grosslobming; Arnulf Kissich; Alfred Zitz, both of Zeltweg, all of Austria

[73] Assignee: Voest-Alpine Berftechnik Gesellschaft m.b.h., Zeltweg, Austria

[21] Appl. No.: 884,873

[22] Filed: May 18, 1992

Related U.S. Application Data

[63] Continuation of Ser. No. 639,653, Jan. 11, 1991, abandoned.

[30] Foreign Application Priority Data

Jan. 12, 1990 [AT] Austria .................................. A64/90

[51] Int. Cl.⁵ .................................................. B65G 65/16
[52] U.S. Cl. ..................................... 198/515; 198/518; 299/68
[58] Field of Search ............... 198/512, 515, 518, 608; 299/56, 57, 45, 46, 64, 67, 68

[56] References Cited

U.S. PATENT DOCUMENTS

| | | | |
|---|---|---|---|
| 2,696,288 | 12/1954 | Ball | 198/515 |
| 3,328,087 | 6/1967 | Palmer | 299/68 |
| 3,817,579 | 6/1974 | Delli-Gatti, Jr. | 299/68 |
| 4,056,189 | 11/1977 | Freed, Jr. | 198/518 X |
| 4,159,055 | 6/1979 | Eberle | 198/518 X |
| 4,231,468 | 11/1980 | Tucker | 198/515 |

Primary Examiner—Robert P. Olszewski
Assistant Examiner—Cheryl L. Gastineau
Attorney, Agent, or Firm—Cushman Darby & Cushman

[57] ABSTRACT

In a loading device with a loading platform for receiving mined material, wherein the loading platform is swept over by loading arms and the material is conveyed onto a conveying device connected to the loading platform, the loading arms are designed as arms of a rotatably mounted loading star-wheel, and a plurality of loading star-wheels are arranged over the width of the loading platform.

8 Claims, 6 Drawing Sheets

LOADING DEVICE FOR MINING

This is a continuation of application Ser. No. 639,653, filed on Jan. 11, 1991, which was abandoned.

BACKGROUND OF THE INVENTION

1. Field of Invention

The invention relates to a loading device with a loading platform for receiving mined material, wherein the loading platform is at least partially swept over by loading arms and the material is conveyed onto a conveying device, in particular a continuous conveyor, joined to the loading platform.

2. Prior Art

Loading devices of the above-mentioned type have become known in various designs for mining or extraction machines. Apart from loading platforms with a clearing surface sloping relatively flatly to the base and of arrow-shaped design in plan view, on which loading platforms lobster-claw-type loading arms are driven to produce a movement deviating from a circular path, it is already known to arrange carriers on a loading-platform chain-conveyor, which carriers pass over the surface of the loading platform. Lobster-claw loading arms require a relatively flat design of the loading platform for satisfactory operation, as a result of which a great overall length in the longitudinal direction of the machine arises. Furthermore, the drive mechanism of lobster-claw loading arms of this type is relatively sensitive and, particularly in the case of larger pieces of rock breaking below, susceptible to breakdown. Chain conveyors also have a relatively sensitive drive mechanism, the guide points or chain star-wheels in particular being subjected to a high level of wear. If chain conveyors of this type are guided in such a way that they subsequently pivot into the path of the conveying device, a loading platform of relatively short construction is thus provided, the guide points and the kinematics of the drive mechanism of the loading arms in the region of the guide points being relatively costly and susceptible to wear, however. If, on the other hand, a conveying device which is separated from the joined main conveying device, and in particular the subsequently connected continuous conveyor, is used on a loading platform as a loading conveyor, it is necessary to arrange the guide star-wheels on the loading platform itself, as a result of which a relatively great overall length arises in the longitudinal direction of the machine since guiding cannot take place about indefinitely small turning radii.

SUMMARY OF THE INVENTION

What is desired is a loading device of the type mentioned at the beginning which, from a constructional point of view, can be designed particularly simply and so as to be reliable against breakdown and with which it is possible to reliably clear loading platforms of short construction and in particular loading platforms with a correspondingly steep surface to be cleared.

The present invention provides a loading device having loading arms designed as arms of a rotatably mounted loading star-wheel, a plurality of loading star-wheels being arranged over the width of a loading platform.

With loading arms designed as arms of a rotatably mounted loading star-wheel, a plurality of star-wheels of this type can be arranged in a simple manner over the width of a loading platform and driven in a simple manner to produce a rotating movement. The parts required for the drive mechanism are able to be arranged below the clearing surface so as to be protected. In this case, the star-wheels ensure transportation of the cut or mined material from the outside of the loading platform inwards, and as a result of the rotating movement of the star-wheels with the loading arms, lifting of the extracted material occurs in the center region, with the result that conveying onto a subsequent continuous conveyor can succeed without any problem. The use of loading star-wheels of this type makes it possible to adapt the width of the loading platform to requirements in a simple manner, the number of star-wheels adjacently rotatably mounted simply having to be correspondingly increased. Fundamental modifications to the drive mechanism are not necessary in the case of this type of wider construction of the loading platform and altogether loading star-wheels of this type require only a relatively short loading platform, with the result that the main aim of producing a loading device of short construction, wherein the loading surface can be designed correspondingly more steeply, can be achieved with components of simple design which are not susceptible to breakdown.

The rotation axes of the star-wheels preferably lie on a common straight line substantially parallel to the front edge of the loading platform. This offers the possibility of constructing the loading platform in a modular manner from a plurality of individual portions. In this case, apart from the drive motor, only a drive shaft continuing over the relevant width of the loading platform is required as a drive mechanism, which drive shaft, by reason of its small dimensions, can easily be arranged below the surface (the clearing surface) of the loading platform so as to be protected, also in a loading platform of short construction. A modular construction and therewith a constructionally simple design for varying constructional widths can be attained in a simple manner if the loading platform is constructed from a plurality of portions each containing a gear, which portions are coupled to each other via a drive shaft extending over the width of the loading platform and divided in accordance with the portions. The division of the drive shaft according to the gear parts, which are each associated with a rotating loading star-wheel, moreover also offers the possibility of arranging a bulky component, i.e. the drive motor for the loading star-wheels, so as to be separate from the loading platform. Housing a drive motor of large construction of this type inside the loading platform would, on the other hand, have the consequence of having to increase the dimensions of the loading platform. Consequently, the arrangement of the drive motor ensues in a particularly preferred manner and in such a way that the drive motor for the drive shaft is arranged above the loading platform and is connected to the drive shaft via a gear, in particular a chain drive, between adjacent loading star-wheels.

In principle, the loading star-wheels along the common drive shaft, in the case of a correspondingly staggered arrangement of the loading arms, can be arranged relatively close to each other if, concurrently with the arrangement of the drive motor above the loading platform, the drive connection can ensue behind the drive shaft, the loading platform seen in plan view. In this case, a chain drive would, however, have to be guided in a multiple fashion since the chain must engage on the drive shaft and would then have to be guided to the drive motor arranged above the loading arms outside the path of the loading arms. In order to avoid a multiple guiding of this type of the drive connection between drive motor and the drive shaft, it is advantageous for the distance between the rotation axes of adjacent loading star-wheels to be greater than the sum of the radii of the areas swept out by adjacent loading star-wheels, the coupling of adjacent portions of the drive shaft via an intermediate shaft being able to take place in a constructionally simple manner, the intermediate shaft carrying a toothed wheel or a chain star-wheel for the drive connection to the drive motor.

In the following, the invention is described in more detail, by way of example only, with the aid of an embodiment shown schematically in the accompanying drawings.

DESCRIPTION OF THE PREFERRED EMBODIMENT

Figure 1:
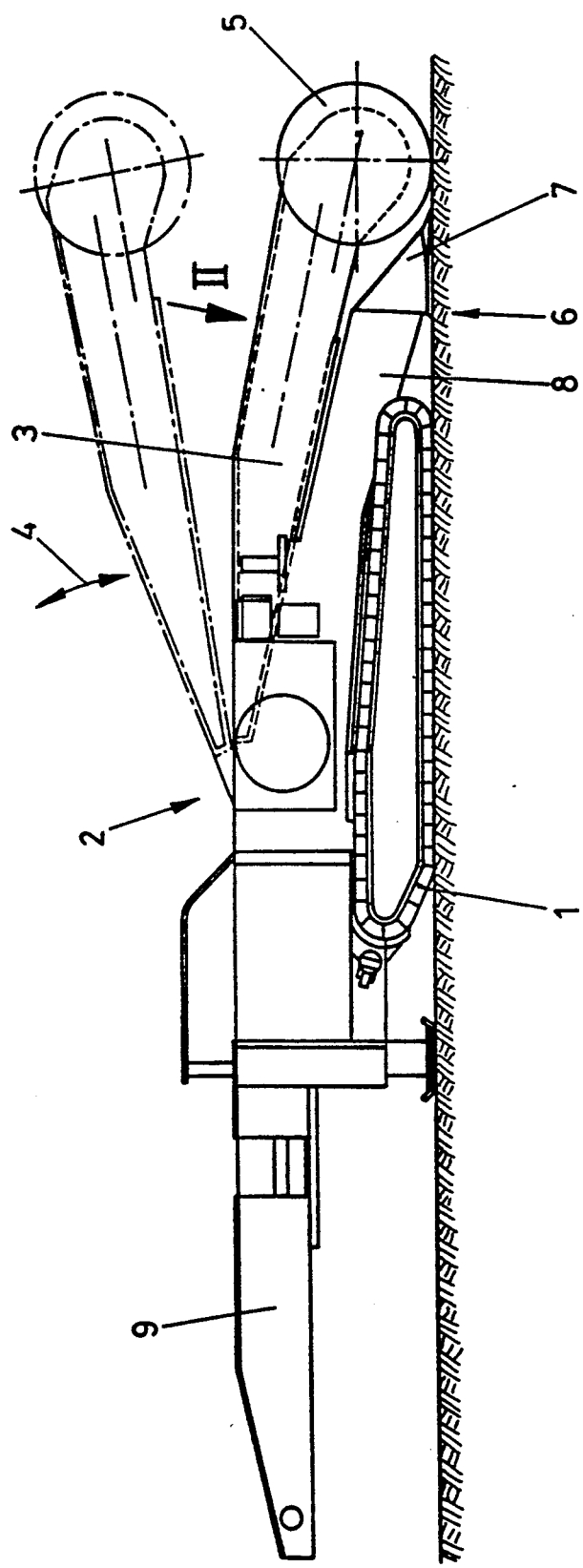
FIG. 1 shows a schematic side view of a mining or extraction machine with a loading device according to the invention.

In FIG. 1, a mining or extraction machine 2 conveyable on a tracked vehicle 1 is shown. For the purposes of mining the rock, the machine carries a cantilever arm 3 which can at least be raised and lowered, as is shown by the double arrow 4, with a mining tool formed by a cutter drum 5 for example. For the purposes of receiving and conveying the mined material, a loading device 6 is provided which has a loading platform 7 and a schematically shown adjacent conveying device 8 which passes over into a further conveyor 9 at the end of the mining machine 2 remote from the cantilever arm 3.

Figure 2:
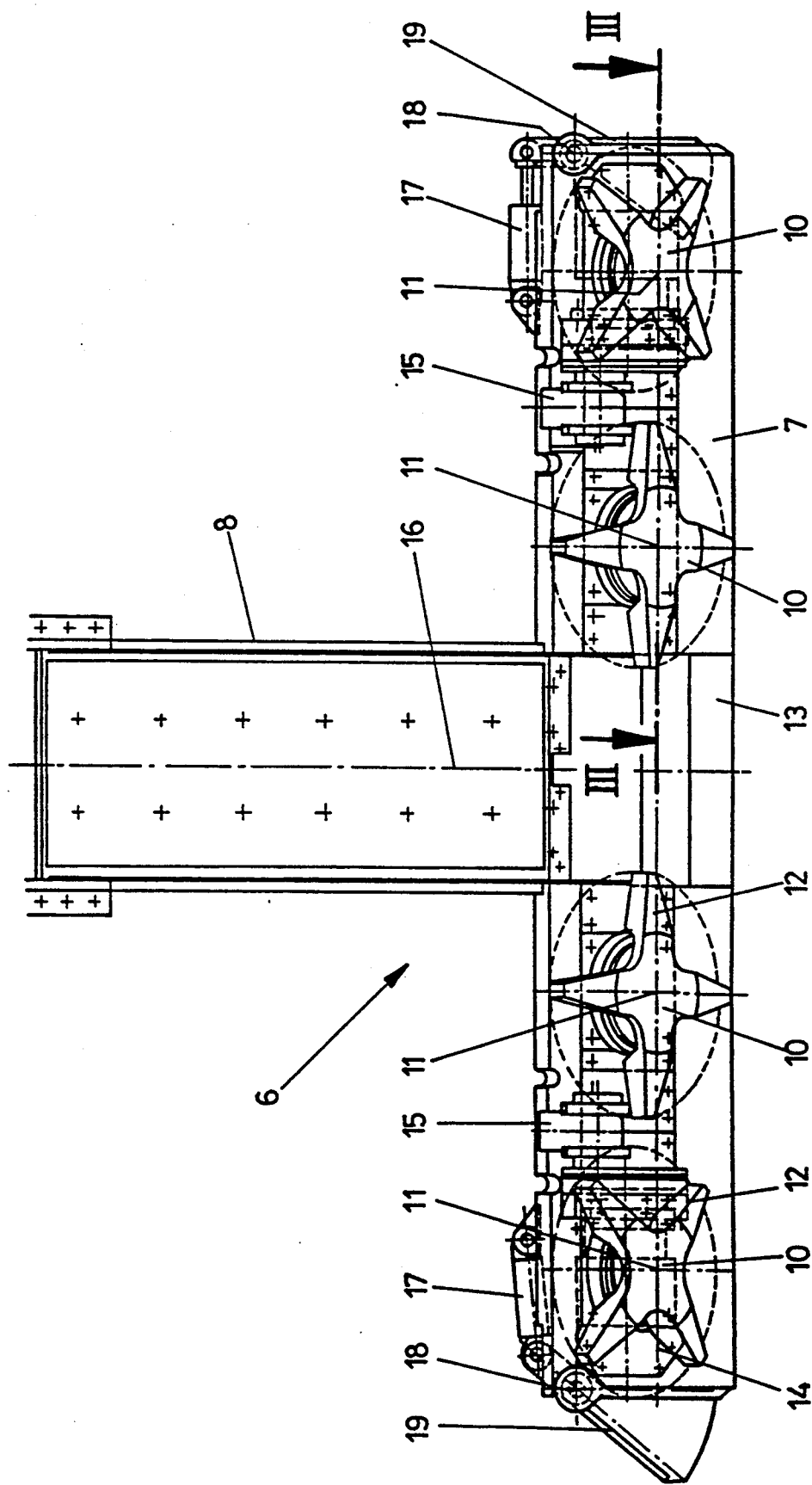
FIG. 2 shows a plan view of the loading device in the direction of the arrow II of FIG. 1.

In FIG. 2, a plan view of the loading device 6, with the loading platform 7 and the adjacent conveying device 8 formed, for example, by a continuous conveyor, is shown on an enlarged scale. The loading platform 7 is swept by rotatably mounted loading star-wheels 10 with rotation axes 11 and loading arms 12. The loading platform 7 shown in FIG. 2 is swept by four star-wheels 10 whose axes 11 intersect a substantially straight line 14 parallel to the front edge 13 of the platform 7, which is of modular construction as shown in FIG. 2. A drive connection 15 (shown in more detail in FIG. 3) for driving the star-wheels 10 arranged on one or other side of the loading platform has an output between two star-wheels on both sides of the continuous conveyor 8. The longitudinal center-line 16 of the mining or extraction machine coincides in the present case with the longitudinal axis of the conveying device 8.

In FIG. 2, means for widening the loading platform 7 are additionally shown which are formed by flat parts 19 which are linked to the lateral ends of the loading platform so as to be tiltable about axes 18 by means of piston-and-cylinder units 17.

The spacing of the rotation axes 11 of two adjacent star-wheels 10 is in this case greater than the sum of the lengths of their respective loading arms 12, i.e. the sum of the radii of the circular areas swept by the star-wheels, with the result that sufficient room remains for the drive connection 15 for driving the star-wheels. It is evident that the star-wheels 10 lying adjacent to the conveying device 8 sweep an area (shown in broken line) by means of their loading arms 12 which ensure reliable transfer of the conveyed material onto the conveying device 8.

Figure 3:
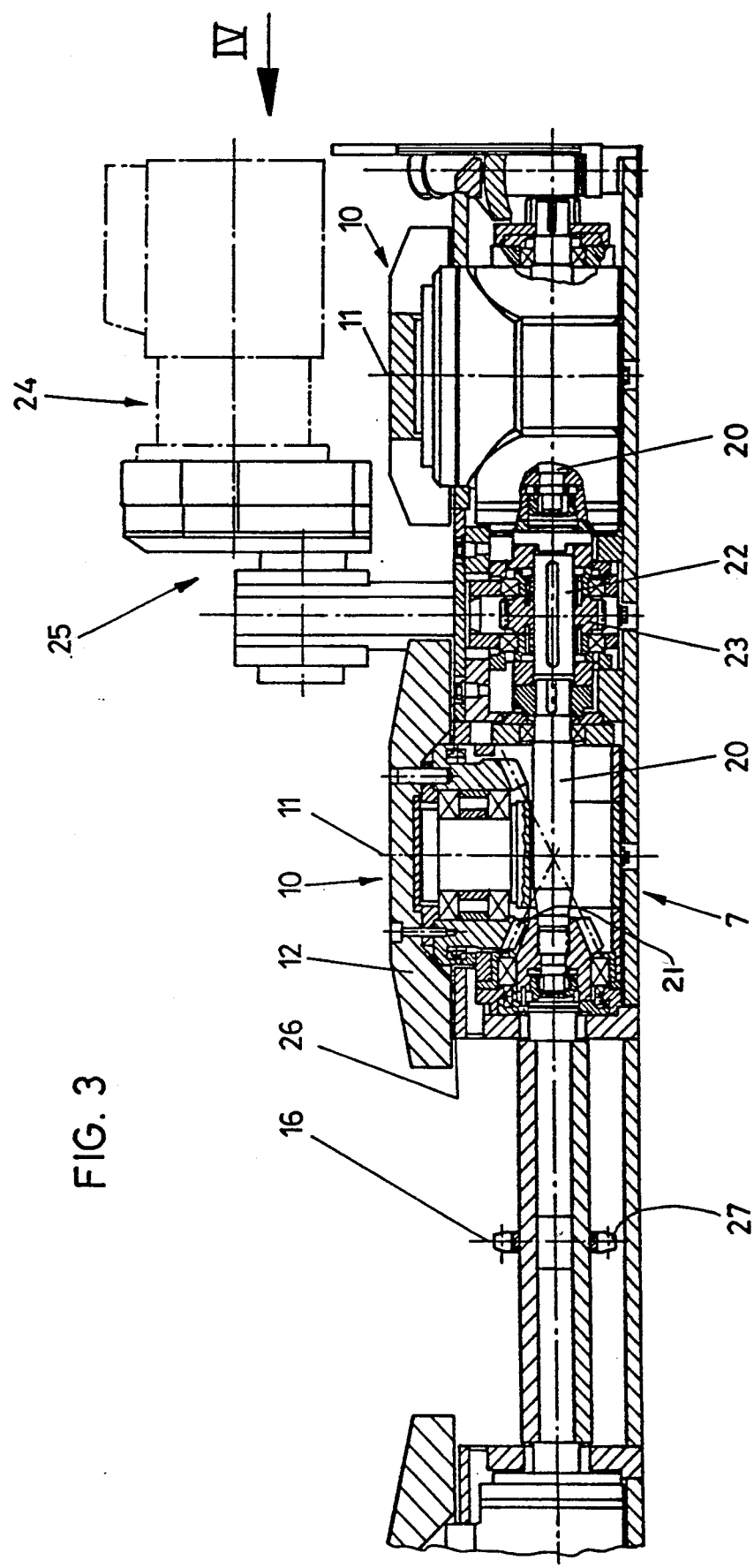
FIG. 3 shows a section through a part of the loading device along line III—III of FIG. 2 on an enlarged scale.

In FIG. 3, only one half of the loading platform 7 in partial section is shown, the center-line 16 again being indicated. The loading star-wheels 10 are driven via a drive shaft 20 designed so as to be divided according to the modular portions of the loading platform and by means of a gear formed from a plurality of gear wheels to produce rotation about their axes 11. The drive of the drive shaft portions 20 takes place via an intermediate shaft 22 which is driven by means of a further gear stage 25 via a toothed wheel or via a chain star-wheel 23 with a drive motor 24 arranged above the loading platform and schematically shown. As a result of the modular construction of the loading platform, each portion having in particular a drive shaft portion 20 and a gear 21 for the purpose of translating the rotary movement of the drive shaft 20 into rotation of the loading star-wheel 10 about its rotation axis 11, a desired number of modular portions of the loading platform, corresponding to the width to be cleared, can be coupled to each other in a simple manner, care having to be taken in addition for a coupling with a drive motor via a correspondingly designed intermediate shaft. The arms 12 - which sweep over the surface 26 of the loading platform - of the loading star-wheels 10 make it possible to transfer the mined and conveyed material directly onto the continuous conveyor 8 lying thereunder in the region of the transfer. The guiding star-wheel 27 of the continuous conveyor 8 is shown in FIG. 3. As is immediately obvious from FIG. 3, all the gear parts and drive shaft parts for the movement of the loading star-wheels 10 can be arranged below the clearing surface 26, the region of the passage of the drive connection from the drive motor 24 to the intermediate shaft 22 likewise being able to be designed so as to be protected accordingly.

Figure 4:
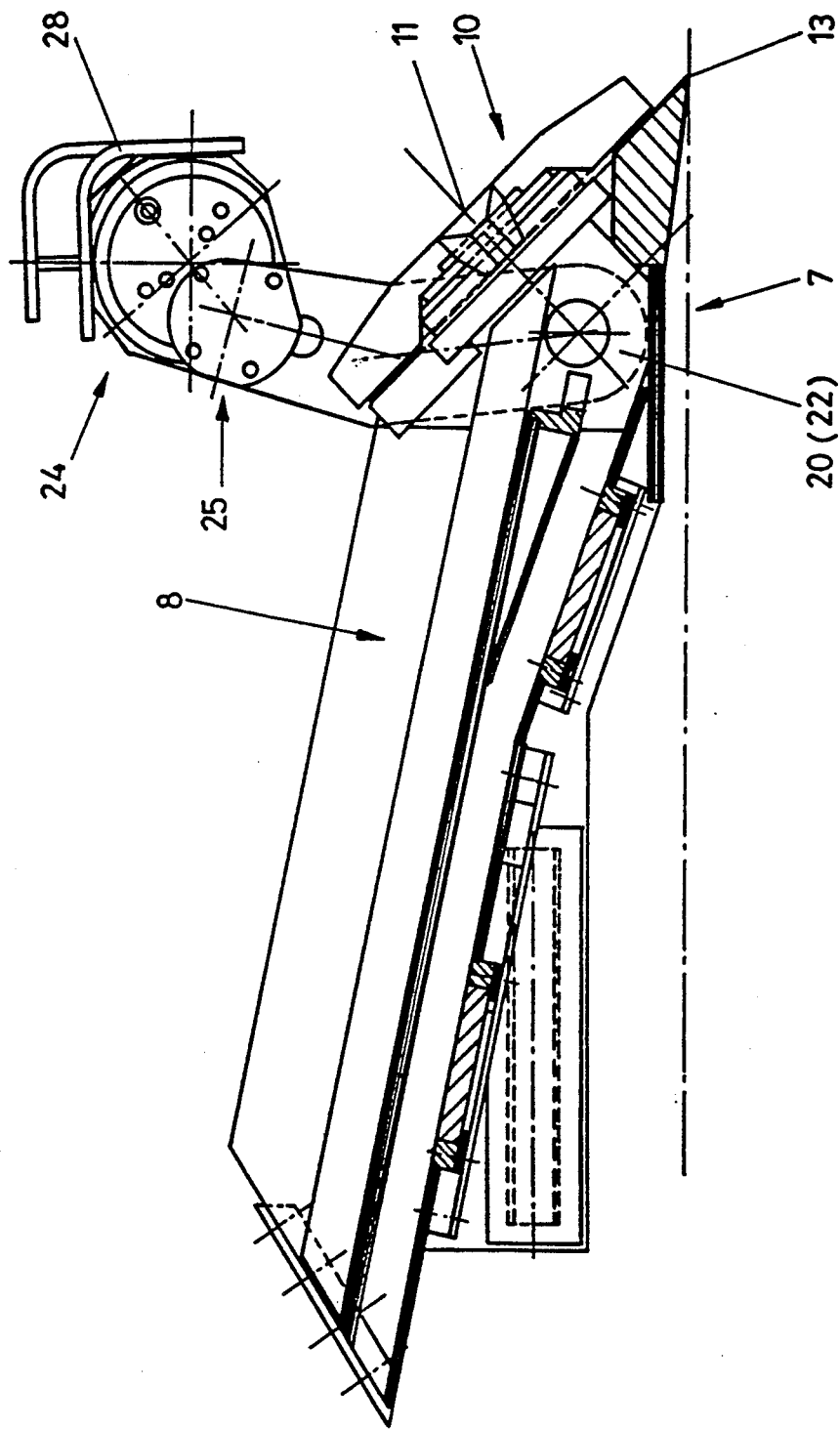
FIG. 4 shows a schematic side view of the loading device in the direction of the arrow IV of FIG. 3.

In FIG. 4, the arrangement of the drive motor 24 above the loading platform 7 is again shown in a side view, the motor 24 being protected from falling rock by appropriate shielding devices 28. It can be seen that the drive connection from the motor 24 to the intermediate shaft 22 or the drive shaft portions 20 via the schematic gear stage 25 can be carried out in an approximate straight line. Furthermore, the very short effective length of the loading platform 7 in the longitudinal direction of the machine can be seen, the steep loading surface produced as a result being able to be reliably cleared by the use of loading star-wheels 10.

Figure 5:
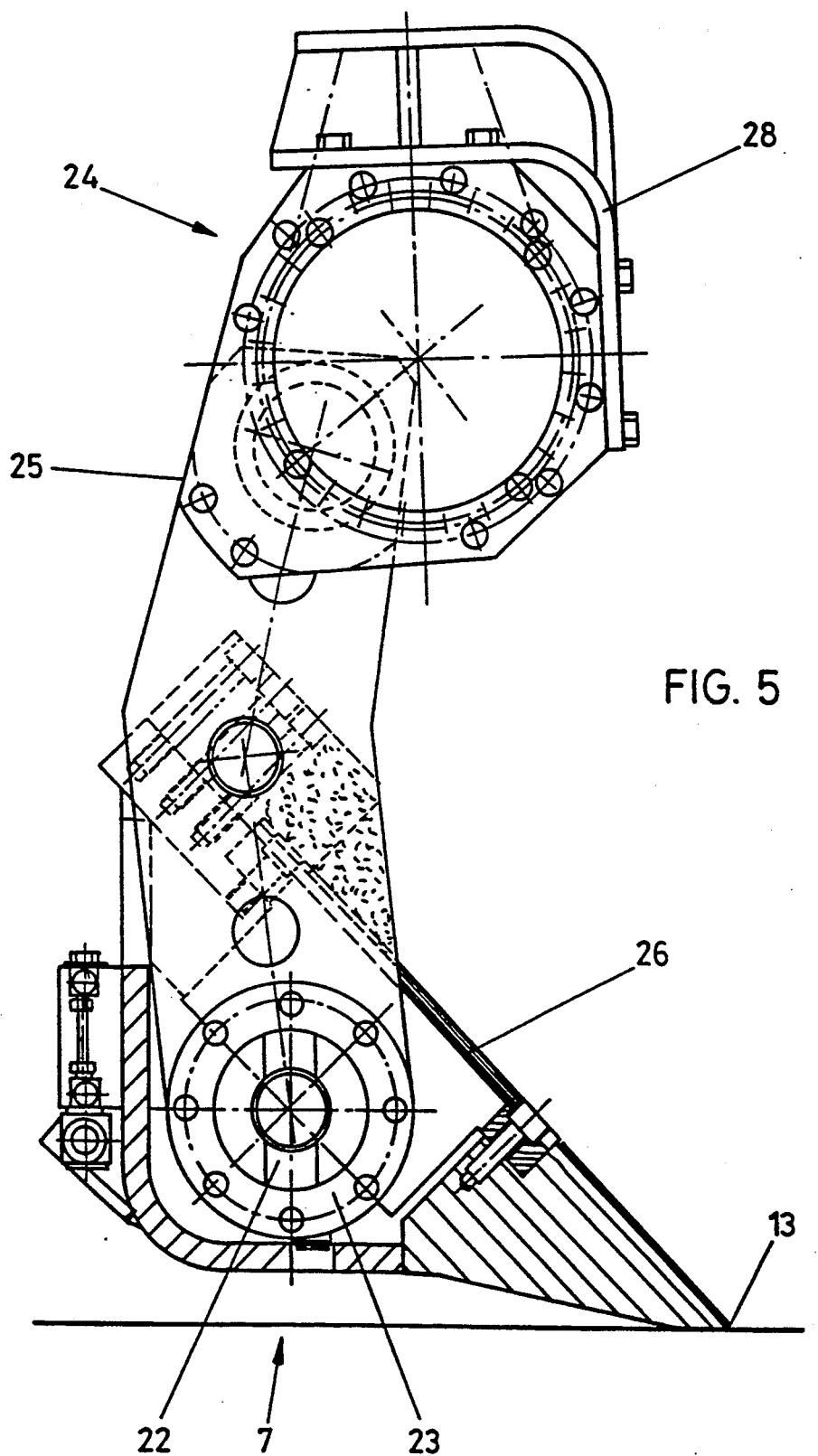
FIG. 5 shows, in enlargement, the arrangement of the drive motor for the loading star-wheels in a view analogous with FIG. 4.

In FIG. 5, the arrangement of the drive motor 24 above the loading platform 7 is again shown in enlargement and similar to FIG. 4, a loading star-wheel not being shown in this case. However, the approximate straight-line arrangement of the drive connection from the gear 25 of the drive motor 24 to the chain star-wheel 23 of the intermediate shaft 22 is shown.

Figure 6:
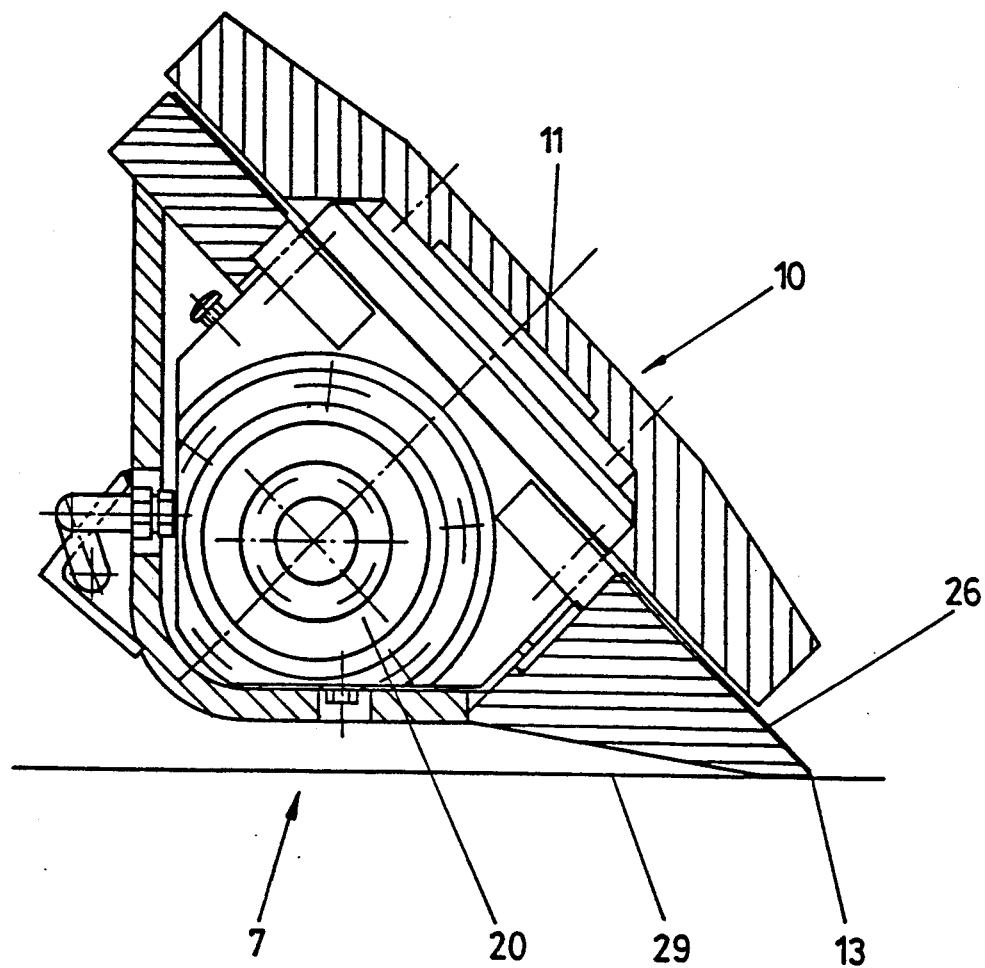
FIG. 6 shows a section through the loading platform and a loading star-wheel on an enlarged scale in relation to FIG. 5.

The very steep adjustment of the surface 26 of the loading platform to be cleared in relation to the ground or the support surface 29 can in particular be seen from FIG. 6. Furthermore, it can be seen that the gear element and shaft portions 20 required for the drive of the loading star-wheel 10 can be housed in the interior of the loading platform 7 without difficulty.

We claim:

1. A modular loading device capable of operating in mined passages having varying widths comprising:

conveying means disposed so as to receive mined material from a loading platform;

a plurality of loading star-wheels disposed along said loading platform, said star-wheels being rotatably mounted to the loading platform and each having arms that sweep over the loading platform as said star-wheel rotates so as to move the mined material along the platform to said conveying means:

wherein said star-wheels have rotational axes intersecting a line running substantially parallel to a front edge of said loading platform; and wherein the loading platform comprises: a plurality of detachably coupled portions, each portion having a star-wheel and associated gearing disposed thereon; and a drive shaft extending along the loading platform for driving the star-wheels, said drive shaft including a plurality of separable segments corresponding to the number of platform portions.

2. A loading device comprising:

conveying means disposed so as to receive mined material from a loading platform; and a plurality of loading star-wheels disposed along said loading platform, said loading star-wheels being rotatably mounted to the loading platform and each having arms that sweep over the loading platform as said star-wheel rotates so as to move the mined material along the platform to said conveying means;

wherein said star-wheels have rotational axes intersecting a line running substantially parallel to a front edge of said loading platform;

wherein the loading platform comprises: a plurality of portions, each portion having a star-wheel and associated gearing disposed thereon; and a drive shaft extending along the loading platform for driving the star-wheels, said drive shaft including a plurality of segments corresponding to the number of platform portions; and wherein said star-wheels are driven by a drive motor disposed above the loading platform, and transmission gearing connecting the drive motor to the drive shaft between adjacent loading star-wheels.

3. A loading device as claimed in claim 2, in which the transmission gearing comprises a chain drive.

4. A loading device as claimed in claim 2, including an intermediate shaft coupling adjacent portions of the drive shaft, the intermediate shaft being driven by the drive motor via the transmission gearing.

5. A loading device as claimed in claim 1, wherein a distance between the rotational axes of adjacent loading star-wheels is greater than a sum of radii of areas swept by the adjacent loading star-wheels.

6. A loading device as claimed in claim 1, wherein the conveying means comprises a continuous conveyor.

7. A loading device as claimed in claim 2, wherein a distance between the rotational axes of adjacent loading star-wheels is greater than a sum of radii of areas swept by the adjacent loading star-wheels.

8. A loading device as claimed in claim 2, wherein the conveying means comprises a continuous conveyor.

* * * * *